US009975378B2

(12) United States Patent
James

(10) Patent No.: US 9,975,378 B2
(45) Date of Patent: May 22, 2018

(54) ROLLED MULTILAYER TIRE INNER LINER PRODUCT AND METHODS FOR PREPARING

(71) Applicant: Bridgestone Americas Tire Operations, LLC, Nashville, TN (US)

(72) Inventor: Michael S. James, Streetsboro, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 677 days.

(21) Appl. No.: 14/358,066

(22) PCT Filed: Nov. 7, 2012

(86) PCT No.: PCT/US2012/063807
§ 371 (c)(1),
(2) Date: May 14, 2014

(87) PCT Pub. No.: WO2013/074338
PCT Pub. Date: May 23, 2013

(65) Prior Publication Data
US 2014/0311645 A1    Oct. 23, 2014

Related U.S. Application Data

(60) Provisional application No. 61/559,858, filed on Nov. 15, 2011.

(51) Int. Cl.
| | |
|---|---|
| *B60C 5/14* | (2006.01) |
| *B32B 7/06* | (2006.01) |
| *B32B 27/00* | (2006.01) |
| *B60C 5/04* | (2006.01) |
| *C09J 7/02* | (2006.01) |
| *B60C 1/00* | (2006.01) |
| *B29D 30/06* | (2006.01) |

(52) U.S. Cl.
CPC ............ *B60C 5/04* (2013.01); *B29D 30/0681* (2013.01); *B32B 7/06* (2013.01); *B60C 1/0008* (2013.01); *C09J 7/0239* (2013.01); *B29D 2030/0682* (2013.01); *B60C 2005/145* (2013.01); *C09J 2201/128* (2013.01); *C09J 2201/61* (2013.01); *C09J 2453/00* (2013.01)

(58) Field of Classification Search
CPC .. B60C 5/00; B60C 5/14; B60C 5/142; B32B 7/06; B32B 7/12; B32B 27/00
See application file for complete search history.

(56) References Cited

U.S. PATENT DOCUMENTS

| | | | |
|---|---|---|---|
| 5,040,583 A | 8/1991 | Lin et al. | |
| 5,738,158 A | 4/1998 | Ozawa et al. | |
| 5,992,486 A * | 11/1999 | Katsuki | B60C 1/0008 |
| | | | 152/510 |
| 6,136,123 A | 10/2000 | Kaido et al. | |
| 6,345,656 B1 | 2/2002 | Corvasce et al. | |
| 6,376,598 B1 | 4/2002 | Wang | |
| 7,404,424 B2 | 7/2008 | Higuchi et al. | |
| 7,600,546 B2 | 10/2009 | Fujino et al. | |
| 7,746,708 B2 | 6/2010 | Kang et al. | |
| 8,616,255 B2 | 12/2013 | Sugimoto | |
| 8,801,884 B2 | 8/2014 | Hashimura et al. | |
| 2004/0089388 A1 | 5/2004 | Fujino et al. | |
| 2006/0243371 A1 | 11/2006 | Kanenari | |
| 2009/0218024 A1 | 9/2009 | Tsou et al. | |
| 2009/0312458 A1 | 12/2009 | Stevenson et al. | |
| 2010/0024941 A1 | 2/2010 | Hara et al. | |
| 2011/0000603 A1 | 1/2011 | Hashimura et al. | |

FOREIGN PATENT DOCUMENTS

| | | |
|---|---|---|
| CN | 1744998 A | 3/2006 |
| CN | 101511573 A | 8/2009 |
| CN | 101942279 A | 1/2011 |
| CN | 102009511 A | 4/2011 |
| EP | 0854054 | 8/2004 |
| EP | 1294581 | 4/2007 |
| EP | 2060386 | 5/2009 |
| JP | 06-040207 | 2/1994 |

(Continued)

OTHER PUBLICATIONS

Office action (with translation) from application No. CN201280062518.7 (dispatched on Feb. 1, 2016).
Office action (with translation) from application No. CN201280062518.7 (dispatched on Sep. 6, 2015).
Office Action from Chinese Application No. 201280062518.7 (dated Dec. 31, 2014).
Response filed in European Application No. 12849927 (dated Oct. 14, 2014).
Tracey, et al., "Dynamically Vulcanized Alloy Innerliners" (dated 2007).
Hong, Sung Ran, International Search Report with Written Opinion from PCT/US2012/063807, 15 pp. (dated Mar. 25, 2013).
Office action (with translation) from application No. JP 2014-542339 (dispatched on Jul. 28, 2015).
Office action (with translation) from Japanese Patent Application No. 2014-542339 (dispatched on Sep. 6, 2016).

(Continued)

*Primary Examiner* — Justin R Fischer
(74) *Attorney, Agent, or Firm* — Meredith E. Hooker; Jenny Sheaffer

(57) ABSTRACT

The present disclosure relates to a rolled multilayer tire inner liner product and processes or methods for preparing a rolled multilayer tire inner liner product. The product comprises a film layer, two adhesive layers (each directly contacting one outer surface of the film layer) and at least one removable partitioning sheet layer contacting the outer surface of at least one of the adhesive layers. The process includes co-extrusion of a film layer and two adhesive layers, addition of at least one partitioning sheet layer to at least one of the adhesive layers either during the co-extruding step or directly thereafter (and may be a mixture of both if more than one partitioning sheet layer is present) and rolling of the layers together (such that if there is only one partitioning sheet layer it faces inward) to form a rolled multilayer tire inner liner product.

11 Claims, No Drawings

(56) References Cited

FOREIGN PATENT DOCUMENTS

| | | |
|---|---|---|
| JP | 2002-144445 A | 5/2002 |
| JP | 2003-026931 A | 1/2003 |
| JP | 2006040207 | 2/2006 |
| JP | 2007276631 | 10/2007 |
| JP | 2009-083776 | 4/2009 |
| JP | 2010-111174 | 5/2010 |
| JP | 2010-260280 | 11/2010 |
| KR | 1020110025597 | 3/2011 |
| WO | 96-34736 A1 | 11/1996 |
| WO | 2007050061 | 5/2007 |
| WO | 2007050236 | 5/2007 |
| WO | 2008-059716 | 5/2008 |
| WO | 2008059716 | 5/2008 |
| WO | WO 2012/134454 | * 10/2012 |

OTHER PUBLICATIONS

Office action (with translation) from Japanese Patent Application No. 2014-542339 (dispatched on Feb. 9, 2016).

* cited by examiner

ROLLED MULTILAYER TIRE INNER LINER PRODUCT AND METHODS FOR PREPARING

FIELD OF INVENTION

The present application relates to a rolled multilayer tire inner liner product and also to methods for preparing a rolled multilayer tire inner liner product. The product comprises a film layer, two adhesive layers (each directly contacting one outer surface of the film layer) and at least one removable partitioning sheet layer contacting the outer surface of at least one of the adhesive layers. The process includes co-extrusion of a film layer and two adhesive layers, addition of at least one partitioning sheet layer to the outer surface of at least one of the adhesive layers either during the co-extruding step or directly thereafter (and may be a mixture of both if more than one partitioning sheet layer is present) and rolling of the layers together (such that if there is only one partitioning sheet layer it faces inward) to form a rolled multilayer tire inner liner product.

BACKGROUND

In order to minimize air leakage and help maintain the internal air pressure of the tire, pneumatic tires utilize an inner liner at the inner surface of the tire. This inner liner is generally made of a substance or substances with limited air permeability such as butyl rubber and/or a halogenated butyl rubber. Inner liners are generally formed in sheets with multiple layers of the inner liner contacting each other and stacked or placed together. When the inner liner is ready to be placed within the tire, the sheet of inner liner is cut to a desired length and wrapped around a building drum with the cut ends meeting or overlapping to an extent, the portion where the cut ends contact resulting in a seam.

SUMMARY OF THE INVENTION

The present disclosure relates to a process for manufacturing a rolled multilayer tire inner liner product. The process comprises co-extruding a film layer and two adhesive layers, adding at least one partitioning sheet layer to the outer surface of at least one of the adhesive layers (either during the co-extruding step or directly thereafter) and rolling the layers together (such that if there is only one partitioning sheet layer it faces inward) to form a rolled multilayer tire inner liner product. The film layer has a thickness between 100 and 400 microns (the terms microns and micrometers are used interchangeably herein and each is meant to denote $10^{-6}$ meters). Each adhesive layer directly contacts one outer surface of the film layer. The adhesive layers are based on one or more thermoplastic elastomers and the composition of each adhesive layer may be the same or different, although the thickness of each is between 10 and 50 microns (although the respective thickness of each need not be the same). Any removable partitioning sheet layer has a thickness of 50 to 500 microns and when two partitioning sheet layers are present they may have the same or different thickness and may have the same or different composition.

The present disclosure also relates to a rolled multilayer tire inner liner product comprising a film layer, two adhesive layers each directly contacting one outer surface of the film layer and at least one removable partitioning sheet layer contacting the outer surface of at least one adhesive layer. The overall thickness of the film layer and the two adhesive layers is 500-120 microns with the film layer having a thickness of 100 to 400 microns and each adhesive layer having a thickness of 10 to 50 microns (although the two adhesive layers need not have the same thickness). Any removable partitioning sheet layer has a thickness of 50 to 500 microns (although when two partitioning sheet layers are present they may have the same or different thickness). The adhesive layers are comprised of at least one thermoplastic elastomer and each adhesive layer may be of the same or different composition overall. With respect to the rolled multilayer tire inner liner product disclosed herein, the film layer and the adhesive layers are comprised of materials that are capable of being extruded by blowing through a stacking die. (In the processes disclosed herein, these layers may be produced by using extruding processes other than blowing through a stacking die.) The film layer has an air permeation coefficient of not more than $25\times10^{-12}$ cc·cm/cm²·sec·cmHg determined according to JIS K7126 at 30° C.

DETAILED DESCRIPTION OF THE INVENTION

The present disclosure relates to methods for preparing a rolled multilayer tire inner liner product and to a rolled multilayer tire inner liner product. The process comprises co-extruding a film layer and two adhesive layers, adding at least one partitioning sheet layer to the surface of at least one of the adhesive layers (either during the co-extruding step or directly thereafter) and rolling the layers together (such that if there is only one partitioning sheet layer it faces inward) to form a rolled multilayer tire inner liner product. Preferably, the rolled multilayer tire inner liner product has one or two partitioning sheet layers. The film layer that is formed has a thickness between 100 and 400 microns (the terms microns and micrometers are used interchangeably herein and each is meant to denote $10^{-6}$ meters) and in other embodiments has a thickness of 100 to 250 microns or a thickness of 100 to 150 microns. The co-extruding process results in each adhesive layer directly contacting one outer surface of the film layer. (In other words, the film layer is sandwiched between adhesive layers.) The thickness of each adhesive layer that results from co-extruding is between 10 and 50 micron and in other embodiments one or both adhesive layer have a thickness of 25 to 50 microns. The adhesive layers may be of the same or of different thickness. As to the partitioning sheet layer or layer, it has a thickness of 50 to 500 microns and in other embodiments has a thickness of 100 to 300 microns. When two partitioning sheet layers are present, they may be of the same or different thickness.

The methods disclosed herein for preparing the rolled multilayer tire inner liner product make use of materials that are capable of being extruded. More specifically, the adhesive layers are based on one or more thermoplastic elastomers and the composition of each adhesive layer may be the same or different. By the phrase based on one or more thermoplastic elastomers is meant that the adhesive layers contain one or more thermoplastic elastomers in a total amount that maintains the ability to extrude the adhesive layers. The composition of the two adhesive layers may be the same or different and each layer may contain the same thermoplastic elastomer(s) or different thermoplastic elastomer(s). Examples of suitable thermoplastic elastomers as well as other materials that may be used in preparing the adhesive layers are well known to those of skill in the art. Non-limiting examples of suitable thermoplastic elastomers include block styrene-butadiene copolymers, epoxidized styrene-butadiene-styrene block copolymers, polybutadiene-isoprene block copolymers, polyamide-polyether copolymers, polystyrene-polyphenylene oxide copolymers, polyurethanes, polyolefins, polyamides, polyesters. In certain embodiments, each adhesive layer is comprised of at least one thermoplastic elastomer selected from the group consisting of block styrene-butadiene copolymers, epoxidized styrene-butadiene-styrene block copolymers, polybutadiene-isoprene block copolymers, polyamide-polyether copolymers, polystyrene-polyphenylene oxide copolymers, polyurethanes, polyolefins, polyamides, polyesters, and combinations thereof.

In certain embodiments, one or both of the adhesive layers may also contain up to 25 phr of one or more tackifiers. When amounts are mentioned herein (e.g., phr) they are intended to encompass both the amount of a substance present in the respective extruded layer of the inner liner product and the amount used to prepare the respective layer (i.e., the amount used in a recipe). Generally speaking, tackifiers are substances that increase the stickiness or tack of the adhesive layer. Suitable tackifiers for use in the adhesive layer are known to those of skill in the art. Non-limiting examples of suitable tackifiers for use in the adhesive layers include phenolic resins, rosins, aliphatic hydrocarbon resins, aromatic hydrocarbon resins, aliphatic-aromatic resins, hydrogenated resins, dicyclopentadiene resins and poly(terpenes). In certain embodiments, one or both of the adhesive layers contain one or more tackifiers selected from the group consisting of phenolic resins, rosins, aliphatic hydrocarbon resins, aromatic hydrocarbon resins, aliphatic-aromatic resins, hydrogenated resins, dicyclopentadiene resins, poly(terpenes) and combinations thereof. The two adhesive layers may contain the same or different tackifiers.

One or both of the adhesive layers may also optionally contain at least one cross-linking agent, at least one curative and/or at least one filler. Each adhesive layer may contain the same or different combination of cross-linking agent, curative and/or filler. In certain embodiments, various amounts of the cross linking agent, curative and/or filler may also be added to the components of the film layer, although this is not preferred (except for those fillers disclosed later that aid in increasing the air impermeability of the film layer). In certain embodiments one or both adhesive layers contain at least one cross-linking agent, curative or filler. Various cross-linking agents suitable for incorporation into the adhesive layers are known to those of skill in the art and include general rubber cross-linking agents (sometimes called vulcanization agents) which are often used in an amount of about 1 to 4 phr. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402) the disclosure of which is herein incorporated by reference. Non-limiting examples of suitable vulcanization agents include, but are not limited to, sulfur in various forms such as powdered sulfur, precipitated sulfur, high dispersion sulfur, surface treated sulfur, insoluble sulfur, dimorpholine disulfide and alkylphenol disulfide. Likewise, various vulcanization accelerators suitable for use in the adhesive layer are known to those of skill in the art who will understand that a suitable vulcanization accelerator will be able to function at a relatively high temperature. Vulcanization accelerators are used at varying amounts including in amounts of about 0.5 to 2 phr. Non-limiting examples of suitable vulcanization accelerators include thiuram based (e.g., tetramethylthiuram disulfide, tetraethylthiuram disulfide, tetramethylthiuram monosulfide, dipentamethylenethiuram tetrasulfide, tetrabenzyl disulfide), dithio acid salt based (e.g., Zn-dimethyldithiocarbamate, Zn-diethyldithiocarbamate, Zn-di-n-butylthiocarbamate, Zn-ethylphenyldithiocarbamate, Te-diethyldithiocarbamate, Cu-dimethyldithiocarbamate, Fe-dimethyldithiocarbamate, pipecolinepipecolyldithiocarbamate), thiourea based (e.g., ethylene thiourea, diethyl thiourea), aldehyde ammonia based (e.g., hexamethylene tetramine), guanidine based (e.g., diphenyl guanidine), thiazole based (e.g., 2-mercaptobenzothiazole or its Zn salt, cyclohexylamine salt, dibenzothiazyldisulfide), and sulfonamide based (e.g., cyclohexylbenzothiazylsulfenamide, N-oxydiethylenebenzothiazyl-2-sulfenamide, N-t-butyl-w-benzothiazolesulfenamide, 2-(thymolpolynyldithio)benzthiazole).

Various fillers may be incorporated into the adhesive layers. Suitable fillers are known to those of skill in the art. Non-limiting examples of suitable fillers for incorporation into the adhesive layers include zinc oxide, clays, fatty acids (e.g., stearic acid, oleic acid), calcium carbonate, magnesium carbonate, talc and combinations thereof. Preferably, when a filler is incorporated into the adhesive layer(s) it is a filler other than carbon black as carbon black does not incorporate well into most thermoplastic elastomers.

The film layer can be comprised of various materials as long as the material or materials are capable of being extruded and meet the general requirement of having low permeability to air and a small amount of reactive sites. In certain embodiments, the material or materials used to prepare the film layer are such that the resulting film layer (at a thickness of 100 to 400 microns) will have an air permeation coefficient of not more than $25 \times 10^{-12}$ cc·cm/cm$^2$·sec·cmHg determined according to JIS K7126 at 30° C. In certain embodiments, the film layer will contain materials such that the combination has a Tg of above 150° C. Suitable materials for use in preparing the film layer are known to those of skill in the art. In certain embodiments, the film layer is comprised of at least one thermoplastic engineering resin and optionally at least one saturated elastomer. By the term saturated elastomer is meant an elastomer having 10% or less unsaturation, preferably 5% or less unsaturation. Non-limiting examples of saturated elastomers include hydrogenated diene rubbers, halogenated rubbers, butyl rubbers, silicone rubbers, sulfur-containing rubbers, fluoro-rubbers, hydrin rubbers, acryl rubbers, ionomers, and ethylene propylene diene monomer rubbers. In certain embodiments, the film layer contains at least one saturated elastomer selected from the group consisting of hydrogenated diene rubbers, halogenated rubbers, butyl rubbers, silicone rubbers, sulfur-containing rubbers, fluoro-rubbers, hydrin rubbers, acryl rubbers, ionomers, ethylene propylene diene monomer rubbers and combinations thereof.

In yet other embodiments, the film layer may be comprised of other materials such as ethylene-vinyl alcohol copolymers (commonly known as EVOH), modified ethylene-vinyl alcohol copolymers, vinylidene chloride polymers, nylon-containing elastomers, dynamically vulcanized alloys and combinations thereof. Commercial sources of these materials are well known to those of skill in the art. For example, a suitable EVOH for use in the film layer is sold commercially by Kuraray Co., Ltd of Osaka, Japan under the trade name EVAL. The ethylene content of any EVOH utilized in the film layer will preferably be less than 50 mole %, even more preferably between 25 and 50 mole %. Higher ethylene content EVOH copolymers (i.e., above 50 mole %)

may have insufficient gas barrier properties and those with ethylene contents that are too low can lead to lower flexing resistance and deteriorated flexing resistance. Any EVOH utilized in the film layer will also preferably have a relatively high amount of saponification (i.e., 90% or greater) as this also aids in gas barrier properties and leads to increased thermostability during forming. Modified ethylene-vinyl alcohol copolymer (or modified EVOH) is obtained by reacting an epoxy compound with an ethylene-vinyl alcohol copolymer. The modification can improve rupture properties of the copolymer and reduce the generation of cracks over time. Vinylidene chloride based polymers for use in the film layer may be a copolymer of vinylidene chloride with one or more comonomers such as vinyl chloride, acrylonitrile, acrylates, methacrylates and acrylic acids. Exemplary materials are sold commercially under the trade name SARAN by Dow Chemical Company. In certain embodiments, the vinylidene chloride based polymers have 60-95% by weight vinylidene chloride content.

In certain embodiments, the film layer may be comprised of one or more dynamically vulcanized alloys. As used herein the term dynamically vulcanized alloy means a material made from a thermoplastic engineering resin and a copolymer of a halogenated isoolefin and a para-alkylstyrene by the process of dynamic vulcanization. Dynamic vulcanization is a process conducted at conditions that vulcanize fully or partially the elastomeric halogen-containing copolymer of the film layer. More generally the engineering resin and the rubber are mixed under high shear conditions and at elevated temperatures in the presence of a curing agent. This results in the rubber being both cross-linked and dispersed as fine particles (e.g., as a microgel) within the engineering resin as a continuous matrix. The composition that results is known as a dynamically vulcanized alloy or DVA. The ingredients are mixed at or above the curing temperature of the rubber using equipment such as roll mills, Banbury® mixers, continuous mixers, kneaders or mixing extruders. The dynamically vulcanized alloy is unique in that although the rubber is cured, the composition can be processed and reprocessed by standard thermoplastic processing techniques such as extrusion, injection molding and compression molding and scrap can be salvaged and reprocessed. Further details concerning the process of dynamic vulcanization are contained in U.S. Patent Application Publication Nos. 2009/0312458 (entitled "Process for Preparing Dynamically Vulcanized Alloys"), 2009/218024 (entitled "Construction Comprising Tie Layer") and 2009/151841 (entitled "Construction Comprising Tie Layer"), and the disclosure of each is incorporated herein by reference.

Various thermoplastic engineering resins may be used in the film layer including polyamide resins and mixtures thereof as well as various nylon resins. Exemplary thermoplastic engineering resins include Nylon 6, Nylon 66, Nylon 6 66 copolymer, Nylon 11, Nylon 12 and mixtures thereof. The copolymer of halogenated isoolefin and a para-alkyl styrene may contain isoolefin copolymers with monomers such as isobutylene or isobutene, 2-methyl-1-butene, 3-methyl-1-butene, 2-methyl-2-butene, 1-butene, 2-butene, methyl vinyl ether, indene, vinyltrimethylsilane, hexane and 4-methyl-1-pentene. Exemplary isoolefin copolymers include multiolefins (e.g., $C_4$ to $C_{14}$ multiolefins such as isoprene, butadiene, 2,3-dimethyl-1-3-butadiene, myrcene, 6,6-dimethyl-fulvene, hexadiene, cyclopentaidene and piperylene and other monomers disclosed in U.S. Pat. Nos. 5,506,316 and 5,162,425 (the disclosure of both patents and all other patents and patent applications mentioned herein is incorporated by reference). Suitable styrenic monomers in the isolefin copolymer can include styrene, methylstyrene, chlorostyrene, methoxystyrene, indene and indene derivatives and combinations thereof. The copolymer of halogenated isoolefin and a para-alkylstyrene can include random copolymers containing a $C_4$ to $C_7$ isoolefin (e.g., isobutylene) and a halomethylstyrene. The halogen of the halogenated isoolefin may comprise any halogen, preferably chlorine or bromine. Suitable copolymers for use in the film layer include copolymers of isobutylene and p-methylstyrene that contain 0.5 to 20 mole % p-methylstyrene with up to 60 mole % of the methyl substituent groups on the benzene ring having a bromine or chlorine atom and acid or ester functionalized versions thereof with halogen displaced by maleic anhydride or acrylic or methacrylic acid functionality. Such interpolymers are known by the term halogenated poly(isobutylene-co-p-methylstyrene) or brominated poly (isobutylene-co-p-methylstyrene) and are commercially available under the tradename EXXPRO from ExxonMobil Chemical Company, Houston, Tex.

As mentioned above, in certain embodiments, the film layer contains at least one thermoplastic engineering resin. Suitable thermoplastic engineering resins are known to those of skill in the art. Non-limiting examples of such thermoplastic engineering resins include polyamide resins (e.g., nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T copolymer, nylon 66/PP copolymer and nylon 66/PPS copolymer), polyester resins (e.g., polybutylene terephthalate, polyethylene terephthalate, polyethylene isophthalate, PET/PEI copolymer, polyacrylate, polybutylene naphthalate, liquid crystal polyester, polyoxyalkylene dimidate/polybutyrate terephthalate copolymer and other aromatic polyesters), polynitrile resins (e.g., polyacrylonitrile, polymethacrylonitrile, acrylonitrile/styrene copolymer, methacrylonitrile/styrene copolymer and methacrylonitrile/styrene/butadieneco-polymer), polymethyacrylate resins (e.g., polymethyl methacrylate and polyethyl methacrylate), polyvinyl resins (e.g., vinyl acetate, polyvinyl alcohol, vinyl alcohol ethylene copolymer, polyvinylidene chloride, polyvinyl chloride, vinyl chloride/vinylidene chloride copolymer, vinylidene chloride/methacrylate copolymer, vinylidene chloride/acrylonitrile copolymer), cellulose resins (e.g., cellulose acetate and cellulose acetate butyrate), fluororesins (e.g., polyvinylidene fluoride, polyvinyl fluoride, polycholorofluoroethylene and tetrafluoroethylene/ethylene copolymer) and imide resins (e.g., aromatic polyimide). Combinations of these thermoplastic engineering resins may also be utilized in the film layer. In certain embodiments, the film layer contains at least one thermoplastic engineering resin selected from the group consisting of polyamide resins, polyester resins, polynitrile resins, polymethyacrylate resins, polyvinyl resins, cellulose resins, fluororesins, imide resins and combinations thereof.

In certain embodiments, the film layer may contain one or more filler materials such as can aid in increasing the air impermeability of the film layer. Suitable examples include various clays, talc, mica, coal dust, silica, calcium carbonate and/or most any low to non-reinforcing filler. Further disclosure concerning useful clay for incorporation into the film layer is provided in U.S. Pat. No. 7,019,063 entitled "Rubber Composition For Inner Liner" (the disclosure of which is incorporated by reference).

The at least one partitioning sheet layer that contacts the outer surface of at least one of the adhesive layers is a removable layer that is intended to be removed after the multilayer tire inner liner product is unrolled but before the inner liner is placed into a tire during the tire building process. In other words, the partitioning sheet layer is not intended to become a part of the inner liner that is built into a tire. In certain embodiments, the multilayer tire inner liner product will have one partitioning sheet layer contacting the outer surface of one of the adhesive layers. In other embodiments, the multilayer tire inner liner product may have two partitioning sheet layers, each contacting the outer surface of one adhesive layer. In embodiments where only one partitioning sheet layer is present, it should face inward during rolling so that the adhesive layer does not stick to itself during rolling. Generally, the partitioning sheet layer allows the multilayer tire inner liner product to be rolled, but prevents the adhesive layer from otherwise sticking together during rolling or during storage of the rolled multilayer tire inner liner product. As discussed in more detail below, various options exist for manufacturing the multilayer tire inner liner product with one or two partitioning sheet layers. The partitioning sheet layer is made from a material or materials with suitable properties to allow for removal of the partitioning sheet layer(s) from the adhesive layer(s) when the multilayer tire inner liner product is unrolled and prior to incorporation into a tire as an inner liner. The material or materials must also be capable of being extruded to form the partitioning sheet layer. Suitable materials for preparation of the partitioning sheet layer include saturated polymers and these materials are well known to those of skill in the art. Exemplary, non-limiting examples of suitable materials for use in the partitioning sheet layer include polyethylene, polypropylene and polybutene.

In general, the respective materials comprising each of the film layer, adhesive layers and partitioning sheet layer are prepared by standard mixing methods known to those of skill in the art. The methods and products disclosed herein are not particularly limited to any specific type of mixing or pre-mixing of ingredients contained with a respective layer. However, when a screw extruder is used to melt the components just prior to blow extrusion, it is preferred that all of the ingredients for a respective layer will have been mixed prior to being adding to the screw extruder that precedes the die. For example, when the film layer comprises at least one thermoplastic engineering resin and at least one saturated elastomer, the components are preferably melt-mixed and suitable methods for dispersing the rubber particles into the thermoplastic engineering resin include use of a screw extruder, kneader, Banbury mixer, bi-axial kneader and extruder. The temperature utilized should be a temperature above that where the thermoplastic engineering resin melts. Mixing time will vary depending upon the type and number of ingredients and the mixing apparatus utilized but is generally from a few seconds to 10-15 minutes. The film layer can then be made into a film (having a thickness in the ranges previously described) by an extrusion process. Similarly, the adhesive layers and the partitioning sheet layer are made into films by an extrusion process. In one embodiment, the film layer and the adhesive layers are co-extruded. In certain embodiments, the co-extruding comprises blowing or blow extrusion. In certain embodiments, the blowing is performed using a three, four or five layer stacking die (depending upon the number of layers to be co-extruded in the blowing process).

The partitioning sheet layer or layers may be co-extruded—generally by blow extrusion—along with the other three layers or may be added to the outer surface of one or both of the adhesive layers directly after the prior three layers have been formed (i.e., before the three layers have been rolled). For illustrative purposes, a general description of plastic extrusion, including blow extrusion is provided below, but the embodiments herein should not be considered to be limited to the particular extrusion process or blow extrusion process described. Variations upon precise methods for co-extruding the layers may occur to those of skill in the art and should be considered to be within the scope of this disclosure.

When extruding plastics, raw material (often in the form of small beads) can be gravity fed from a top mounted hopper into the barrel of the extruder. Additives (in liquid or pellet form) may be mixed into the material prior to arriving at the hopper. The raw material enters through the feed throat (an opening near the throat of the barrel of the extruder) and comes into contact with a screw. The screw rotates (often very quickly such as at 100 rpm or more) and forces the raw material forward into the barrel of the extruder where it is heated to the desired melt temperature. In many processes, a heating profile is set for the barrel in which three or more independent controlled heater zones gradually increase the temperature from the rear (where the raw material enters) to the front. This allows for gradual melting and decreases the risk of overheating (which can lead to degradation). Heat is generated by the high pressure and friction that takes place in the barrel of the extruder. In certain instances, it may be possible to turn off any external heat source and rely upon the heat generated from the pressure and friction within the barrel. Cooling fans or other cooling methods (e.g., forced air cooling, cooling jacketing using water) may be used to maintain the temperature below a desired value if too much heat is generated within the barrel.

At the front of the extruder barrel, the molten plastic leaves the screw and travels through a screen pack that serves to remove contaminants from the melted material. Screens are often reinforced with metal breaker plates (a thick puck containing many holes) because the pressure within can be very high (5000 psi or more). The screen and breaker plate help create back pressure in the barrel. Back pressure is required to ensure uniform melting and mixing of the raw materials. The amount of pressure generated can be adjusted by varying the screen pack configuration. The combination of the screen pack and the breaker plate also help convert the rotational memory of the plastic into longitudinal memory.

After the molten material passes through the breaker plate it enters the die. The die gives the final product its profile (in this instance a film) and is designed to allow the molten material to flow evenly from a cylindrical shape to the final shape. Uneven flow must be avoided as it will produce a product with variations and stresses at points in the profile.

In one or more embodiments disclosed herein, the layers of the multilayer tire inner liner product are formed using blow extrusion. In a blow extrusion process, the raw material is treated the same in the barrel of the extruder, but a special type of die is used. The die has the general appearance of an upright cylinder with a circular opening similar to a pipe die. The diameter can be a few centimeters to a few meters. The molten material is pulled upward from the die opening (such as by a pair of nip rolls above the die). Changing the speed by which the molten material is pulled upwards can change the thickness of the film. Around the die is an air-ring which acts to cool the film as it travels upward. In the center of the die is an air outlet from which compressed air is blown into the center of the extruded material creating a bubble-like or tube-like appearance. Within the tube, the partitioning sheet layer (if co-extruded along with the film layer and the adhesive layers) may be the inner-most layer, the outer-most layer or may be present as both the inner-most layer and the outer-most layer. The blowing expands the cross-section of the extruded material by some multiple of the die diameter. The ratio is often referred to as the blow-up ratio. The nip rolls (when present) help to flatten the tube into a double layer of film with a width equal to ½ the circumference of the blown tube. (In embodiments where the partitioning sheet layer is the inner-most layer, its presence will prevent the collapsed adhesive sheet layer from sticking to itself, thereby facilitating opening of the "folded" or collapsed product.) One side of the folded or collapsed product may be cut or slit to allow for opening or unfolding to a film with a width approximately equal to the circumference of the blown tube. This cutting or slitting may take place at various points. For example, the slitting may take place before or after rolling of the multilayer tire inner liner product.

In certain circumstances, it may be advantageous to roll the multilayer tire inner liner product after slitting but before opening of the product to its full width to facilitate storage in a relatively shorter roll form. In such embodiments, it is preferred that the multilayer tire inner liner have two partitioning sheet layers (i.e., one that will be located on the inside of the unfolded product and a second that will be present on at least the top or bottom of the unfolded product covering that portion of the outer adhesive layer). It can be appreciated that the presence of a second partitioning sheet layer in such an embodiment allows the multilayer tire inner liner product to be more easily rolled and unrolled without the outer adhesive layer sticking to itself during rolling. The second partitioning sheet layer may be added by co-extruding it along with the first partitioning sheet layer such as during blow extruding. Alternatively, the second partitioning sheet layer may be added directly after co-extruding (i.e., before rolling of the product) by extruding the second partitioning sheet layer onto the top of the folded product (thereby covering only one half of the sheet which will suffice if the product remains unfolded when it is rolled) or onto the top of the unfolded product prior to rolling. In certain embodiments, it may also be advantageous to roll the multilayer tire inner liner product before slitting. In such embodiments, it is envisioned that two partitioning sheet layers will be present (i.e., one on the inside of the folded product and a second covering at least the "top" or "bottom" of the outside of the folded product) to avoid sticking of the inner adhesive layer to itself during folding and sticking of the "top" outer adhesive layer or the "bottom" outer adhesive layer during rolling.

In other embodiments, the multilayer tire inner liner product is formed with only one partitioning sheet layer (i.e., the outer surface of only one of the adhesive layers contains a partitioning sheet layer). In such embodiments, the four layer tire inner liner product is preferably slit and opened prior to rolling and then rolled with the partitioning sheet layer facing inward so that one adhesive layer will not stick to itself when the product is rolled.

In yet other embodiments, the multilayer tire inner liner product is formed by blow extruding without any partitioning sheet layer being co-extruded. In such embodiments, the product is preferably slit and opened to its full width prior to being collapsed or folded to avoid sticking of the inner adhesive layer to itself. One or two partitioning sheet layers can be added to the outer surface of one or both of the adhesive layers prior to rolling of the multilayer tire inner liner product to avoid sticking of the adhesive layer to itself.

An advantage of using blow extrusion (as compared to traditional film extrusion processes) is that blow extrusion does not result in edges where there may be quality (i.e., thickness) variations. After extruding, the formed product (i.e., the film) is usually cooled. Cooling is often achieved by pulling the extruded film through a water bath or for thinner films through a series of cooling rolls. In embodiments where the partitioning sheet layer is not co-extruded with the film layer and the adhesive layers, it may be added to the top of one of the adhesive layers either before or after cooling. After the partitioning sheet layer has been applied and the multilayer tire inner liner product has been cooled, it can be rolled onto a spool with the partitioning sheet layer facing inward. The rolled multilayer tire inner liner product may be stored and/or transported. As mentioned previously, the partitioning sheet layer or layers is intended to be removed prior to incorporation of the multilayer tire inner liner into a tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A rolled multilayer tire inner liner product comprising:
    a. a film layer with a thickness of 100 to 400 microns;
    b. two adhesive layers each directly contacting one outer surface of the film layer and each having a thickness of 10 to 50 microns and
    c. at least one removable partitioning sheet layer contacting the outer surface of at least one adhesive layer and having a thickness of 50 to 500 microns.
    wherein (i) the overall thickness of the film layer and the two adhesive layers is 120-500 microns; (ii) each adhesive layer is comprised of at least one thermoplastic elastomer and may be of the same or different composition overall; (iii) the film layer and the adhesive layers are comprised of materials that are capable of being extruded by blowing through a stacking die; and (iv) the film layer has an air permeation coefficient of not more than $25 \times 10^{-12}$ cc·cm/cm$^2$·sec·cmHg determined according to JIS K7126 at 30° C.

2. The rolled multilayer tire inner liner product of claim 1, wherein the film layer has a thickness of 100 to 250 microns.

3. The rolled multilayer tire inner liner of product claim 1, wherein each adhesive layer has a thickness of 25 to 50 microns.

4. The rolled multilayer tire inner liner product of claim 1, wherein the at least one thermoplastic elastomer of the adhesive layer is selected from the group consisting of block styrene-butadiene copolymers, epoxidized styrene-butadiene-styrene block copolymers, polybutadiene-isoprene block copolymers, polyamide-polyether copolymers, polystyrene-polyphenylene oxide copolymers, polyurethanes, polyolefins, polyamides, polyesters, and combinations thereof.

5. The rolled multilayer tire inner liner product of claim 1, wherein the film layer is comprised of at least one thermoplastic engineering resin and optionally at least one saturated elastomer.

6. The rolled multilayer tire inner liner product of claim 1, wherein
   a. the at least one thermoplastic engineering resin of the film layer is selected from the group consisting of polyamide resins, polyester resins, polynitrile resins, polymethyacrylate resins, polyvinyl resins, cellulose resins, fluororesins, imide resins and combinations thereof; and
   b. the at least one saturated elastomer of the film layer is selected from the group consisting of hydrogenated diene rubbers, halogenated rubbers, butyl rubbers, silicone rubbers, sulfur-containing rubbers, fluoro-rubbers, hydrin rubbers, acryl rubbers, ionomers, ethylene propylene diene monomer rubbers, and combinations thereof.

7. The rolled multilayer tire inner liner product of claim 1, wherein the adhesive layer further comprises up to 25 phr of one or more tackifiers.

8. The rolled multilayer tire inner liner product of claim 7, wherein the one or more tackifiers are selected from the group consisting of phenolic resins, rosins, aliphatic hydrocarbon resins, aromatic hydrocarbon resins, aliphatic-aromatic resins, hydrogenated resins, dicyclopentadiene resins, poly(terpenes) and combinations thereof.

9. The rolled multilayer tire inner liner product of claim 8, wherein the adhesive layer further comprises at least one component selected from the group consisting of curatives, vulcanization accelerators, fillers and combinations thereof.

10. The rolled multilayer tire inner liner product of claim 1, wherein the film layer is comprised of at least one material selected from the group consisting of ethylene-vinyl alcohol copolymers, modified ethylene-vinyl alcohol copolymers, vinylidene chloride polymers, nylon-containing elastomers, dynamically vulcanized alloys and combinations thereof.

11. The rolled multilayer tire inner liner product of claim 1, wherein the partitioning sheet layer is comprised of polyethylene, polypropylene, or polybutene.

* * * * *